UNITED STATES PATENT OFFICE.

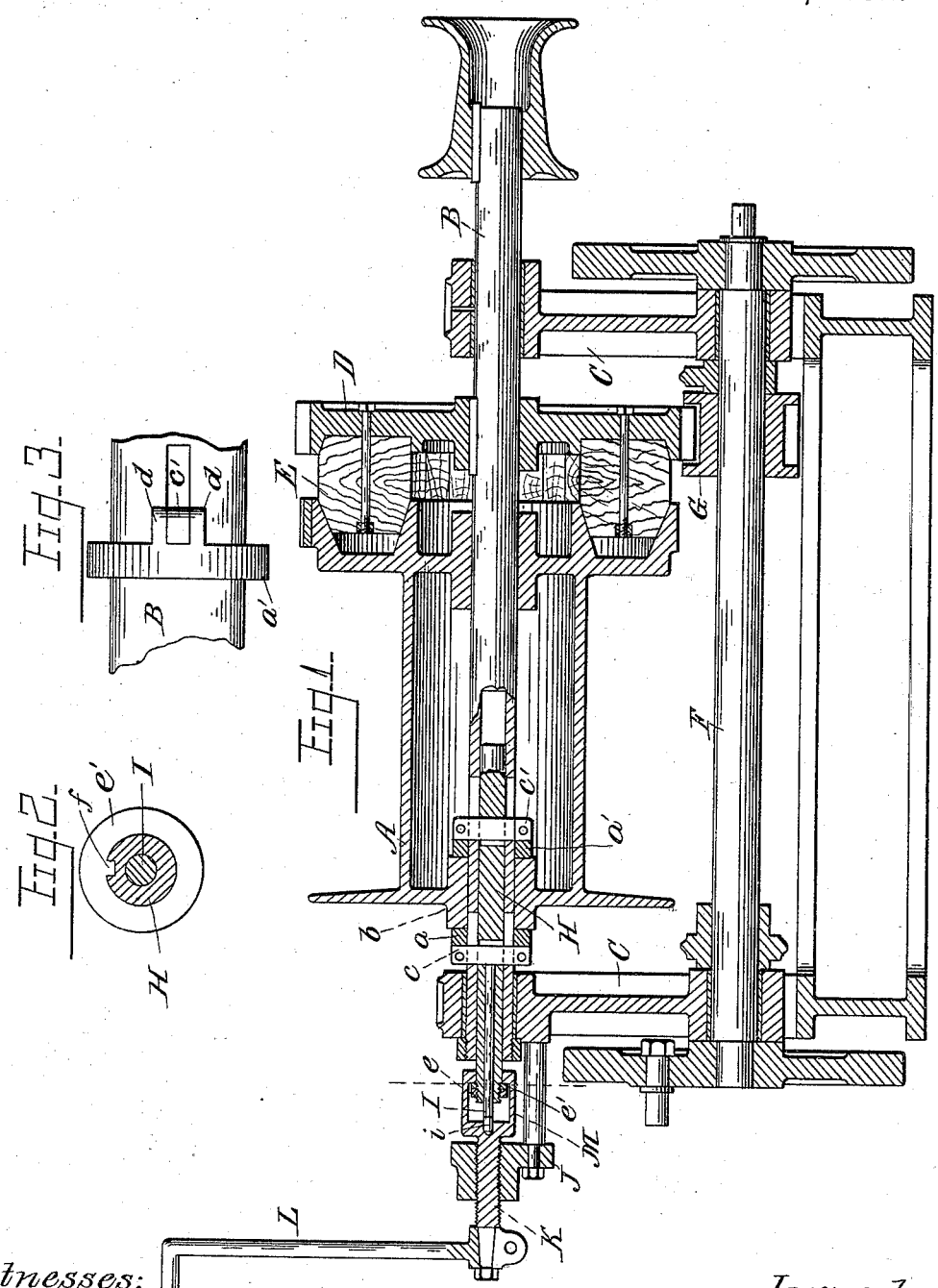

HUGH JAMES McKEOWN, OF NEWPORT, KENTUCKY.

HOISTING MACHINERY.

SPECIFICATION forming part of Letters Patent No. 488,447, dated December 20, 1892.

Application filed April 20, 1892. Serial No. 429,935. (No model.)

*To all whom it may concern:*

Be it known that I, HUGH JAMES MCKEOWN, a citizen of the United States, residing at Newport, in the county of Campbell and State of Kentucky, have invented a new and useful Improvement in Hoisting Machinery, of which the following is a specification, reference being had to the accompanying drawings.

My invention relates to improvements in that class of machinery used for hoisting purposes, which employs a loose drum and a friction clutch, and consists in a device for the better control of the winding drum, while raising or lowering the object to be moved, the objects of my improvement being to provide an easier and more effective connection for positively moving the drum in and out of contact with the friction wheel by a single lever. It has been found that where springs are employed to keep the drum normally out of contact with the friction wheel, as the friction wheel wears an increasing force is required to keep the drum in contact with it. On my improvement no springs are employed, but the drum is moved positively in both directions.

In the drawings:—Figure 1 is a longitudinal central section of a hoisting apparatus embodying my invention. Fig. 2 is an enlarged detail section through the line $x$—$x$ of Fig. 1. Fig. 3 is an enlarged detail plan of one of the drum-adjusting collars.

Similar letters of reference are used to indicate identical parts in all the figures.

The winding drum A revolves loosely upon the shaft B, journaled upon the frame C. A gear wheel D, keyed to the shaft B, has bolted to its inner face the friction blocks or clutch E. A pinion G meshing with the gear wheel D is secured upon the shaft F also journaled upon the frame C and carrying upon each end driving wheels for connection with the necessary motive power.

Passing through the bracket J, secured to the frame C, is a threaded shaft K to the outer end of which is fastened the operating handle or lever L, while its inner end forms a yoke M.

The shaft B is bored out sufficiently to receive a shaft H which is fitted to move longitudinally therein and this shaft H is also bored out and forms a sleeve for the reception of a loose pin I. The outer end of shaft H is threaded and held within the yoke M by the nut $e$ and washer $e'$. Within the yoke M a short abutting pin $i$ is rigidly fastened, so as to receive the impact of the loose pin I. To prevent the nut $e$ from being turned off the end of the shaft H by the washer $e'$ when the shaft is revolving, I provide a lug $f$ upon the inner circumference of the washer which fits into a corresponding groove upon the shaft H as shown in Fig. 2.

Upon both sides of the bearing $b$ of the drum A are collars $a$, $a'$, having lugs $d$ between which are secured the gibs $c$, $c'$ passing through slots in the shafts B and H.

In order to secure as great a friction as possible, the friction blocks or clutch E secured to the gear wheel D are made tapering or conical and fit within a corresponding recess in the end of the drum A. I find in practice that this construction gives better results with its double surface than where only one surface is used.

In the operation of my invention, the object to be raised is to be fastened to a rope or chain which is carried around the drum A; the lever L is then moved sufficiently to cause the pin $i$ to press the loose pin I against the gib $c$ in the collar $a$ which in turn moves the drum A toward and in contact with the friction blocks or clutch E secured upon the face of the gear wheel D which receives its motion from the pinion G upon the shaft F revolved by the necessary power through the driving wheels upon either end. When it is desired to lower the object thus raised, a slight reverse movement of the lever L is made and the yoke M pulling against washer $e'$ and nut $e$ causes the shaft H to move outward and against the gib $c'$ forcing the collar $a'$ against the bearing $b$ of the drum A thus taking the latter from contact with the friction blocks E. It will be seen that the revolutions of the drum are fast or slow as the operator may desire according to the force with which the drum is held against the friction wheel E.

Having thus described my invention, the following is what I claim as new therein, and desire to secure by Letters Patent:—

1. In combination with the shaft B bored at one end, a lifting drum loosely mounted upon the said shaft, the shaft H inserted in the bore of said shaft B, collars $a$, $a'$ on the shaft B mounted upon opposite sides of the bearing of the lifting drum, and gibs c, c' connecting the respective collars a, a' to the shaft H, all substantially as and for the purpose set forth.

2. In combination with the shaft B, a lifting drum loosely mounted upon said shaft, collars a, a' mounted upon the shaft B on opposite sides of the drum, and having gibs c, c' secured between lugs upon said collars and shaft H within the shaft B; said shafts B and H having slots through which gibs c and c' pass, substantially as described.

3. In combination with the shaft B, bored at one end, a lifting drum, the shaft H, longitudinally movable in the bore of shaft B, collars a, a' mounted upon shaft B on opposite sides of the drum and carrying gibs c, c' which pass through shafts B, H the loose pin I inserted in the shaft H, and means for adjusting the pin I and shaft H against the gibs c and c' substantially as described.

4. In a hoisting apparatus the combination with shaft B, drum A and shaft H controlling the movement of the drum on shaft B, of the threaded shaft K having at one end the yoke M secured to and adapted to turn upon the end of the shaft H, substantially as described.

5. In a hoisting apparatus the combination with the shaft B, drum A, loosely mounted on shaft B, and shaft H adapted to move the drum on shaft B, of the shaft K threaded into the frame, and connected to one end of shaft H by means of the yoke M, the nut e, and washer e' substantially as described.

6. In a hoisting apparatus, the combination with the shaft B, and drum A mounted to turn thereon; of the shaft H having positive connection with the drum for moving it in one direction, a pin having positive connection with drum A for moving it in the opposite direction, the threaded shaft K connected to shaft H by yoke M, and pin i rigidly secured to said yoke, and adapted to press against the pin I, substantially as and for the purpose set forth.

7. In a hoisting machine, the combination of a main shaft having connections for receiving motion from a source of power, a friction head fixed to the main shaft, a winding drum loosely mounted on the main shaft and adapted for frictional engagement with the friction head, a pair of collars on opposite sides of the drum, a shaft within the main shaft, a pair of gibs carried by the respective collars and passing through slots formed in the main and inner shafts to receive said gibs, a pin within the inner shaft bearing against one of the gibs, and a controlling shaft screw threaded into the frame of the machine and having swivel connection with the inner shaft and bearing against the pin, whereby, movement of the controlling shaft out or in, communicates motion to the winding drum, through the inner shaft or the pin, all substantially as set forth.

The foregoing specification of my invention signed by me this 26th day of March, A. D. 1892.

HUGH JAMES McKEOWN.

Witnesses:
JEPTHA GARRARD,
J. B. BECKER.